May 14, 1935.  S. MORSE  2,001,210

AUTOMATIC REGULATION OF WATER IN STORAGE BATTERIES

Filed Feb. 11, 1931

INVENTOR
Sterne Morse
BY
Evans & McCoy
ATTORNEYS

Patented May 14, 1935

2,001,210

UNITED STATES PATENT OFFICE 2,001,210

AUTOMATIC REGULATION OF WATER IN STORAGE BATTERIES

Sterne Morse, Richmond Heights, Ohio

Application February 11, 1931, Serial No. 515,020

4 Claims. (Cl. 136—162)

This invention relates to the operation of storage batteries, more particularly those of the type used in starting and lighting systems for automobiles, although not at all limited to this particular use.

Storage batteries used for this purpose are practically invariably provided with generators by which under average use the batteries are automatically kept in the charged condition by the operation of the car. Inasmuch, however, as the use of a given car may vary between almost no use and almost constant use, it is difficult or impossible to devise a system which, under certain circumstances, will not overcharge and in other circumstances undercharge. Undercharging with the lead storage cell will result in serious damage or destruction of the battery, particularly in cold weather. Overcharging, on the other hand, is not serious except for the fact that dissociation of the water of the electrolyte occurs, but it can result in the destruction of the cell if the loss of water so occurring is not periodically made up. For this reason the average battery generator is made and adjusted so that under average use slight overcharging occurs. Adjusting of the charging current can easily be made to fit the average operation of the individual car. However, even in this respect the adjustment can only be roughly accurate and it is always safe to err on the side of overcharging. It is consequently always necessary to replenish the water lost from a battery from time to time, and in fact even where the most perfect adjustment has been made, some loss of water occurs during natural charging and discharging.

It is an object of this invention to provide a method by which this lost water however occurring may be made up automatically.

It is a further object to provide a method by which this loss of water may be made up by the passage of air containing water vapor into the cells of the battery contacting with the electrolyte and giving up water thereto.

It is a further object to provide a method by which this loss of water may be made up by the passage of air or other gas containing water vapor into the cells of the battery contacting with the electrolyte and giving up water thereto.

It is a further object to provide a simple device whereby the volume of the electrolyte in such a cell controls such passage of air or other gas and water vapor into the cell, no passage occurring when such volume exceeds a certain maximum.

It is a further object to have the operation of a car cause such passage of air or other gas and water vapor to occur when the volume of the electrolyte in any cell of the battery has fallen below the maximum.

It is a further object to provide a method whereby air can be loaded with water vapor to the necessary amount and then be caused to flow through a cell in which the volume of the electrolye has become too small.

To illustrate the method of the invention appropriate apparatus will be described and flured.

Figure 1:
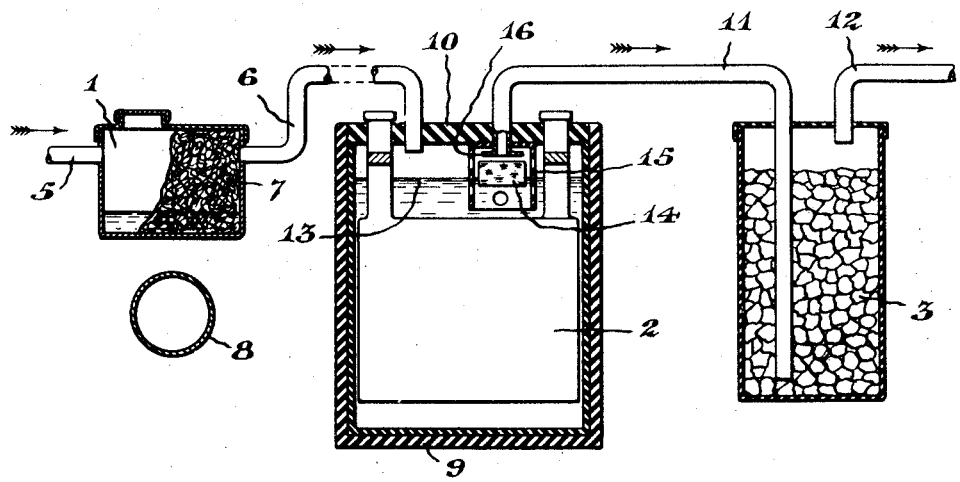
Figure 1 shows in a a diagrammatic way an apparatus suitable for carrying out the method of the invention, only a single cell of the battery being shown.
Figure 2:
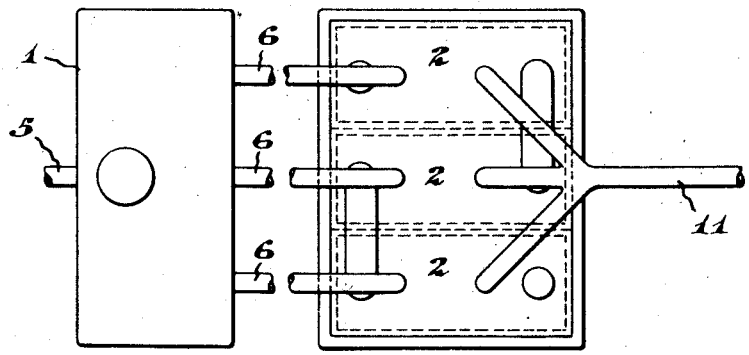
Figure 2 is a representation of the apparatus shown in Fig. 1 in plan showing the method of parallel connection where the battery, as is usually the case, consists of several cells.

In this figure there is shown a humidifier 1, a battery cell 2, and a trap 3. The humidifier 1 may conveniently be made a vessel closed except for an entering tube 5 and exit tube 6, and may be filled with loose absorbent cotton 7. Some source of heat should be supplied. For example, the humidifier may be located, in the case of an automotive system, above the exhaust manifold of the engine, shown as 8. By the exit tube 6 the humidifier communicates with the storage cell 2 which is provided with a jar 9 with a sealed in cover 10 in the usual manner so that the whole is tight. There is provided the exit tube 11 leading to the trap 3 which has the exit tube 12. Some method of moving air through these tubes will be provided, here by connecting tube 12 to the intake manifold of the engine.

The trap 3 may be packed with some absorbant of sulphuric acid vapor, such as broken limestone, although the amount of sulphuric acid which passes normally is almost infinitesimally small. This trap is strictly not necessary in normal operation but is provided for safety's sake.

The outlet tube 11 of the battery cell is provided with a float valve 14 which may be of any suitable construction whereby rise of the level 13 of the electrolyte of the cell causes closure of the inlet end of exit tube 11. This is shown as a cylinder of cork lying in a perforated vetrical tube 15 which serves as a guide. The end of tube 11 is provided with a flat, enlarged portion 16 constituting a seat for the float 14 as it is carried up by rise in the level of the electrolyte 13.

Operation is as follows: Let it be assumed that the cell starts with the proper amount of water in the electrolyte. Under these circumstances, the level 13 of the electrolyte will be high enough to carry the float 14 up against the seat 16 closing the tube 11. No flow of air under these conditions will take place through the tubing system 5, 6, 11, 12. However, as gas is evolved under operation of the battery 2 it will have a free path of exit back through tube 6, humidifier 1 and tube 5. As water is dissociated from the electrolyte in the storage cell 2 the level 13 progressively falls, causing the float 14 to drop away from the seat 16. When this occurs, the flow of air through tube 5, humidifier 1, tube 6, cell 2, tube 11, trap 3 and tube 12, occurs. In passing through humidifier 2, this air becomes more or less loaded with water vapor, depending on the temperature of the humidifier 1. As this air is drawn above the electrolyte in cell 2 part of the water vapor is given up to the electrolyte owing to the fact that the water vapor tension of the relatively warm and relatively pure water in humidifier 1 is very much higher than that of the relatively cold electrolyte containing considerable sulphuric acid in cell 2. In the case of an automotive system, it is desirable that humidifier 1 be at a relatively high level so that the course of tube 6 is downward toward cell 2, because in cold weather condensation of water may occur in this tube owing to its being at a colder temperature than humidifier 1. If the course of this tube is downward, this water will eventually reach cell 2. The absorption of the water vapor from the air passing through the cell 2 is much facilitated by the splashing of the electrolyte which occurs as a natural result of driving the car, and in this way the water added becomes thoroughly mixed with the whole body of electrolyte rather than forming a thin layer at the top. In this way water is progressively added to the electrolyte and the volume of the electrolyte in cell 2 increases. The float 14 thereby is caused to engage with the seat 16 and in this way a further passage of air and water vapor to the cell is prevented.

The process is otherwise self-regulatory. In very cold weather the drain on the battery is heavier and as a rule little water is dissociated, and consequently, little water is required. At this time the temperature of the humidifier will be less and the amount of water vapor taken up by the passing air less. In summer, when much water is broken up, large amounts of vapor will be carried by a given amount of air.

The humidifier may be provided as shown or may be of other form. For example, the connection by tube 6 may be made with the air space above the water in the radiator, although this would not be advisable if a volatile anti-freezing substance such as alcohol is being used therein. The humidifier 1 may conveniently be made of glass or have a glass window and may very conveniently have added thereto some substance which changes color or appearance when dry, such for example as chromic sulphate or cobalt chloride. Ordinary water may be added to it when the radiator is replenished inasmuch as the process involves distillation. It will be conveniently mounted in plain view when the hood is raised.

Discharge of the battery causes a slight diminution of volume of the electrolyte, but this effect is small, being only 6.7% from full charge to full discharge and can be disregarded ordinarily, although it is possible to obviate disturbance in this way of the process outlined if desired. This can be done by including a valve actuated by a solenoid with polarized armature, in such manner that it remains closed except while a charging current passes through the battery, the device now used to prevent discharge of the battery through the generator while the car is idle being modifiable therefor.

It will thus be seen that I have provided a method by which the water in a storage battery may be automatically replenished, which is cheap, simple and certain in action. Use of this method removes one of the most serious causes of deterioration of storage batteries and renders their life much greater. Use of distilled water is unnecessary. All these advantages, and others, will be apparent to those skilled in the art. It will also be apparent that this method may be conveniently employed for other than automotive purposes, as for example, in automatic electric lighting systems for houses where storage batteries are used. Here the charging generator will operate a fan, as is now customary for cooling. The blast from the fan will pass through a humidifier and then will be caused to pass above the electrolyte in the cell, or better, bubble therethrough, on account of the fact that these cells are not being shaken as is the case with an automotive storage battery.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The method of adding water, principally in the form of its vapor, to the electrolyte in a storage battery cell comprising humidifying air outside of the cell and passing it within the cell into contact with the electrolyte therein.

2. The method of adding water, principally in the form of its vapor, to the electrolyte in a storage battery cell comprising humidifying air outside of the cell and passing it within the cell into contact with the electrolyte therein, and controlling the flow of said humidified air within and through said cell in such manner that rise of level of the electrolyte in said cell causes reduction in rate of flow of said humidified air through said cell and fall of said level causes increase in rate of said flow.

3. The method of adding water, principally in the form of its vapor, to the electrolyte in a storage battery cell comprising humidifying gas outside of the cell and passing it within the cell into contact with the electrolyte therein.

4. The method of adding water, principally in the form of its vapor, to the electrolyte in a storage battery cell comprising humidifying gas outside of the cell and passing it within the cell into contact with the electrolyte therein, and controlling the flow of said humidified gas within and through said cell in such manner that rise of level of the electrolyte in said cell causes reduction in rate of flow of said humidified gas through said cell and fall of said level causes increase in rate of said flow.

STERNE MORSE.